No. 782,664. PATENTED FEB. 14, 1905.
J. G. JOHNSON.
BICYCLE STAND.
APPLICATION FILED JUNE 10, 1904.
2 SHEETS—SHEET 1.
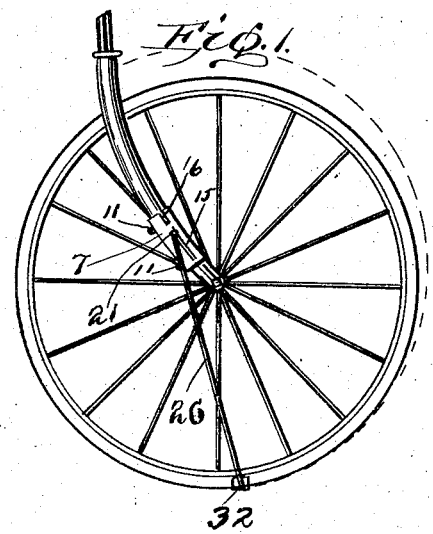
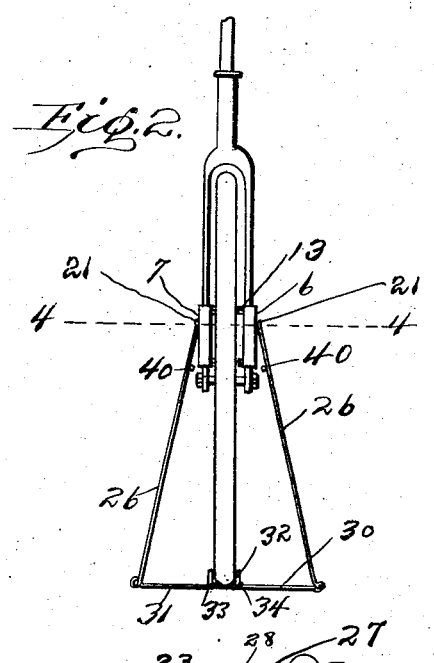
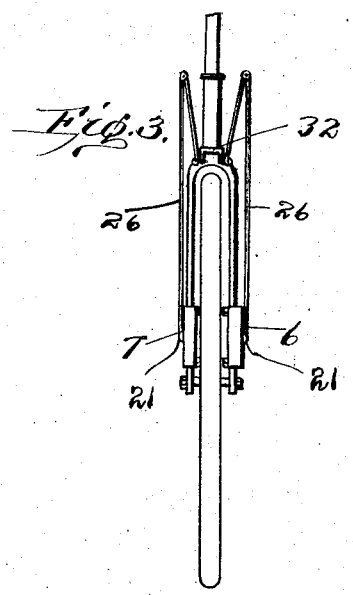
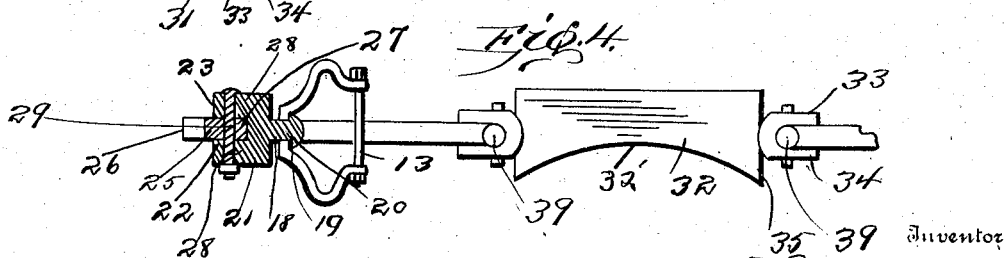
Inventor
J. G. Johnson
Witnesses
By
Attorneys

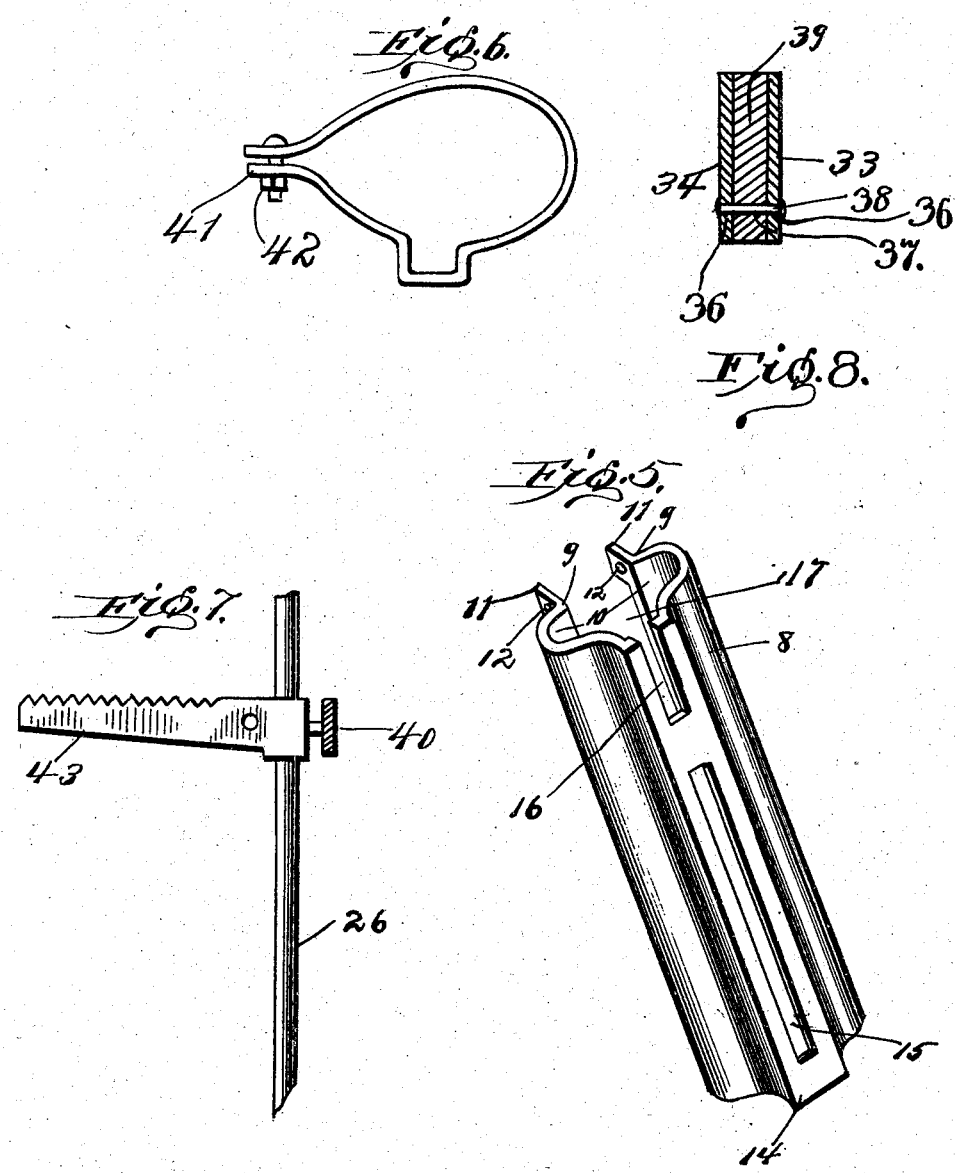

No. 782,664.　　　　　　　　　　　　　　　　　　　Patented February 14, 1905.

UNITED STATES PATENT OFFICE.

JOHN G. JOHNSON, OF MOUNTAIN, NORTH DAKOTA.

BICYCLE-STAND.

SPECIFICATION forming part of Letters Patent No. 782,664, dated February 14, 1905.

Application filed June 10, 1904. Serial No. 212,027.

*To all whom it may concern:*

Be it known that I, JOHN G. JOHNSON, a citizen of the United States, residing at Mountain, in the county of Pembina, State of North Dakota, have invented certain new and useful Improvements in Bicycle-Stands; and I do hereby declare the following to be a full, clear, and exact description of the invention, such as will enable others skilled in the art to which it appertains to make and use the same.

This invention relates to bicycles, and more particularly to stands therefor, and has for its object to provide a stand which may be attached to a bicycle and which may be moved into and out of position to support the bicycle when desired.

A further object is to provide a stand which may be quickly attached to and detached from a bicycle.

In the drawings forming a portion of this specification, and in which like numerals of reference indicate similar parts in the several views, Figure 1 is a side elevation of a bicycle provided with the present form of stand and showing the latter in operative position. Fig. 2 is a front view of Fig. 1. Fig. 3 is a view similar to Fig. 2, showing the stand in inoperative position. Fig. 4 is a section on line 4 4 of Fig. 2 with the stand removed from the bicycle. Fig. 5 is a perspective view of one of the attaching members. Fig. 6 shows a modified form of the attaching members, and Fig. 7 is a view showing a modification in which the device is provided with coasters.

Referring now to the drawings, the present invention comprises two members 6 and 7, each of which consists of a metallic plate 8, bent transversely into arc shape to conform to the shape of the front forks of a bicycle, the free edges 9 of the plate being bent inwardly toward each other to form flanges 10, having outwardly-extending ears 11 adjacent to the ends of their inner edges, the ears of one flange alining with those of the other, the ears being provided with perforations 12 for the reception of tie-bolts 13, by means of which the member is secured to the bicycle-fork.

Each of the members 6 and 7 is provided with a longitudinal rib 14 in its outer curved face, and this rib is provided with a longitudinal slot 15, which terminates short of the ends thereof, and has also a notch 16, which communicates with the upper end of the rib. As will be seen from the drawings, the ribs 14 are in reality convolutions formed in the metal of the members 6 and 7, so that there are longitudinal recesses 17 in the inner concave surfaces of the members, the slots 15 communicating with these recesses.

Disposed in the slots 15 are the shanks 18 of headed pins 19, the heads 20 of which lie in the recesses 17, while the shanks are secured at their free ends to blocks 21, which lie against the outer faces of the ribs 14, the pins 19 being movable both longitudinal of and pivotally in the slots 15. The outer ends of the blocks 21 are bifurcated, as shown at 22, and between the resultant spaced portions 23 and 24 of each block is disposed the flattened end 25 of a rod 26, which has a perforation 27 therethrough registering with alining perforations 28 in the spaced portions 23 and 24, a pivot-pin 29 being engaged with the perforations 28 of each block and the perforation 27 of each of the rods 26.

To the free ends of the rods 26 are hinged rods 30 and 31, which extend inwardly between the rods 26 and are pivotally connected at their free ends to a central plate 32. The central plate 32 consists of a strip of metal having its ends turned at right angles thereto in the same direction, and the side portions 33 and 34 of these ends are cut away from the main portion of the plate, as shown at 35, and are bent at right angles to the end to form spaced portions, as shown. These spaced portions at either end of the plate are provided with alining perforations 36 adjacent to their lower ends, with which there are registered perforations 37 in the ends of the rods 30 and 31, the registering perforations receiving pivot-pins 38, and beyond the perforations 37 the ends of the rods 30 and 31 are bent upwardly, as shown at 39, these upwardly-bent portions lying when the rods 30 and 31 are in alinement with each other, as shown in Fig. 2, between the spaced portions 33 and 34 and against the angular ends of the plate 32, thus acting as stops to limit the pivotal movement of the rods 30 and 31 and the plate 32 in one direction. Free movement of the rods 30 and 31 and the plate 32 is permitted, however, in the direction of the members 6 and 7, so that the rods 30 and 31 may be moved to lie against the rods 26 and will be spaced from each other by the plate 32.

When in position to support the bicycle, the stand is disposed in a position (shown in Figs. 1 and 2) with the rods 30 and 31 in alinement with each other and with the plate 32 and resting upon the ground, the blocks 21 being at the upper ends of the slots 15. In this way an efficient support is provided for the bicycle which will hold it in its upright position. When it is desired to move the stand out of operative position, it is but necessary to move the lower ends of the rods 26 forwardly and upwardly in an arc, the pins 19 moving pivotally in the slots 15 and permitting of this operation. When the rods 26 have been thus moved to extend above and in alinement with the members 6 and 7, the blocks 21 and pins 19 are allowed to descend to the bottoms of the slots 15, and headed pins 40, which are carried by the rods 26, are engaged with the notches 16 to hold the rods against further movement, it being understood that the rods 30 and 31 have been moved to lie against the rods 26, as mentioned above, the pivotal connection of the rods 26 and the blocks 21 permitting of this movement. In this position the plate 32 lies against the head of the bicycle and is provided with an arc-shaped recess 32' in one of its edges and in which the head is received.

In Fig. 6 there is shown a modification of the attaching members 6 and 7, in which these members consist of a piece of metal bent to lie at both sides of the fork and having ears 41 at its free edges which aline with each other and have perforations 42 for the reception of bolts to hold the members in position.

In Fig. 7 the rods 26 are shown provided with coasters 43, which are attached thereto and which have the pins 40 extending inwardly therefrom.

What is claimed is—

1. The combination with a bicycle, of members attached to the front forks thereof, said members having notches therein, rods pivotally connected at one end with the members, a brace secured at its ends to the free ends of the rods, said rods being movable upon their pivots to bring the brace into a different position to rest upon the ground, and pins carried by the rods, said rods being arranged for sliding movement with respect to the members to engage the pins in the slots when the brace is out of position to engage the ground, to hold the rods against movement.

2. A bicycle-stand comprising members arranged for attachment to the forks of a bicycle, rods connected at one end to the members, a brace connected to the free ends of the rods, said rods being movable to bring the brace into and out of engagement with the ground, means carried by the rods and arranged for engagement with the members for holding the brace out of engagement with the ground, said rods being movable slidably with respect to the members to bring said means into operative position.

3. The combination with a bicycle, of a stand therefor comprising members removably attached to the forks of the bicycle, rods connected each at one end to a member, a brace connected to the free ends of the rods and including hinged sections, said rods being movable pivotally with respect to the members to bring the brace into and out of engagement with the ground, means carried by the rods and coöperating at times with the members for holding the brace out of engagement with the ground, the brace being collapsible and the rods being arranged for movement slidably with respect to the members to bring said holding means into its operative position.

In testimony whereof I affix my signature in presence of two witnesses.

JOHN G. JOHNSON.

Witnesses:
S. BJARNASON,
H. H. REYKJALIN.